United States Patent
Hwang et al.

(10) Patent No.: US 7,492,141 B2
(45) Date of Patent: Feb. 17, 2009

(54) RESONANT INVERTER EXHIBITING DEPRESSED DUTY VARIATION

(75) Inventors: Jong-Tae Hwang, Seoul (KR); Moon-Sang Jung, Seoul (KR); Dong-Hwan Kim, Bucheon-si (KR); Jin-Sung Kim, Seoul (KR)

(73) Assignee: Fairchild Korea Semiconductor, Ltd., Bucheon-Si (KR)

( * ) Notice: Subject to any disclaimer, the term of this patent is extended or adjusted under 35 U.S.C. 154(b) by 127 days.

(21) Appl. No.: 11/784,162

(22) Filed: Apr. 4, 2007

(65) Prior Publication Data

US 2007/0229051 A1    Oct. 4, 2007

(30) Foreign Application Priority Data

Apr. 4, 2006    (KR) .................... 10-2006-0030334

(51) Int. Cl.
G05F 1/40    (2006.01)
G05F 1/56    (2006.01)
(52) U.S. Cl. ................. 323/284; 323/282; 323/285; 323/286
(58) Field of Classification Search ............. 323/282, 323/284, 285, 286
See application file for complete search history.

(56) References Cited

U.S. PATENT DOCUMENTS

| | | | |
|---|---|---|---|
| 5,339,052 A | 8/1994 | Melse | |
| 5,572,158 A | 11/1996 | Lee et al. | |
| 5,793,193 A * | 8/1998 | Hodgins | 323/284 |
| 6,005,444 A | 12/1999 | Carpelan | |
| 6,198,322 B1 | 3/2001 | Yoshimura | |
| 6,246,222 B1 * | 6/2001 | Nilles et al. | 323/283 |
| 6,597,159 B2 * | 7/2003 | Yang | 323/283 |
| 6,611,131 B2 * | 8/2003 | Edwards | 323/282 |
| 6,917,249 B1 | 7/2005 | Kuo et al. | |
| 7,019,504 B2 * | 3/2006 | Pullen et al. | 323/283 |
| 7,119,522 B1 * | 10/2006 | Tomiyoshi | 323/224 |
| 7,170,273 B2 * | 1/2007 | Sase et al. | 323/285 |
| 7,372,241 B1 * | 5/2008 | Tomiyoshi | 323/288 |

* cited by examiner

*Primary Examiner*—Bao Q Vu
(74) *Attorney, Agent, or Firm*—Sidley Austin LLP (57) ABSTRACT

A resonant inverter includes a first driver and a second driver for driving a first and second switching devices, respectively, a dead time generator for generating a first drive signal and a second drive signal respectively, a current-controlled oscillator for supplying, to the dead time generator, an output clock having a frequency determined based on a first current input to the current-controlled oscillator, and a current mirror for supplying the first current to the current-controlled oscillator in an amount proportional to a second current flowing through an external resistor. The current mirror includes a track/hold circuit, to supply the second current in an amount equal to an amount of the second current supplied before a variation in the amount of the second current, during a transition of an output signal between the first and second switching devices.

14 Claims, 7 Drawing Sheets

RESONANT INVERTER EXHIBITING DEPRESSED DUTY VARIATION

CROSS-REFERENCE TO RELATED APPLICATION

This application claims priority to and the benefit of Korea Patent Application No. 10-2006-0030334 filed on Apr. 4, 2006 in the Korean Intellectual Property Office, the entire content of which is incorporated herein by reference.

BACKGROUND

1. Field of the Invention

The present invention relates to a resonant inverter, and more particularly to a resonant inverter exhibiting a depressed duty variation.

2. Description of the Related Art

Figure 1:
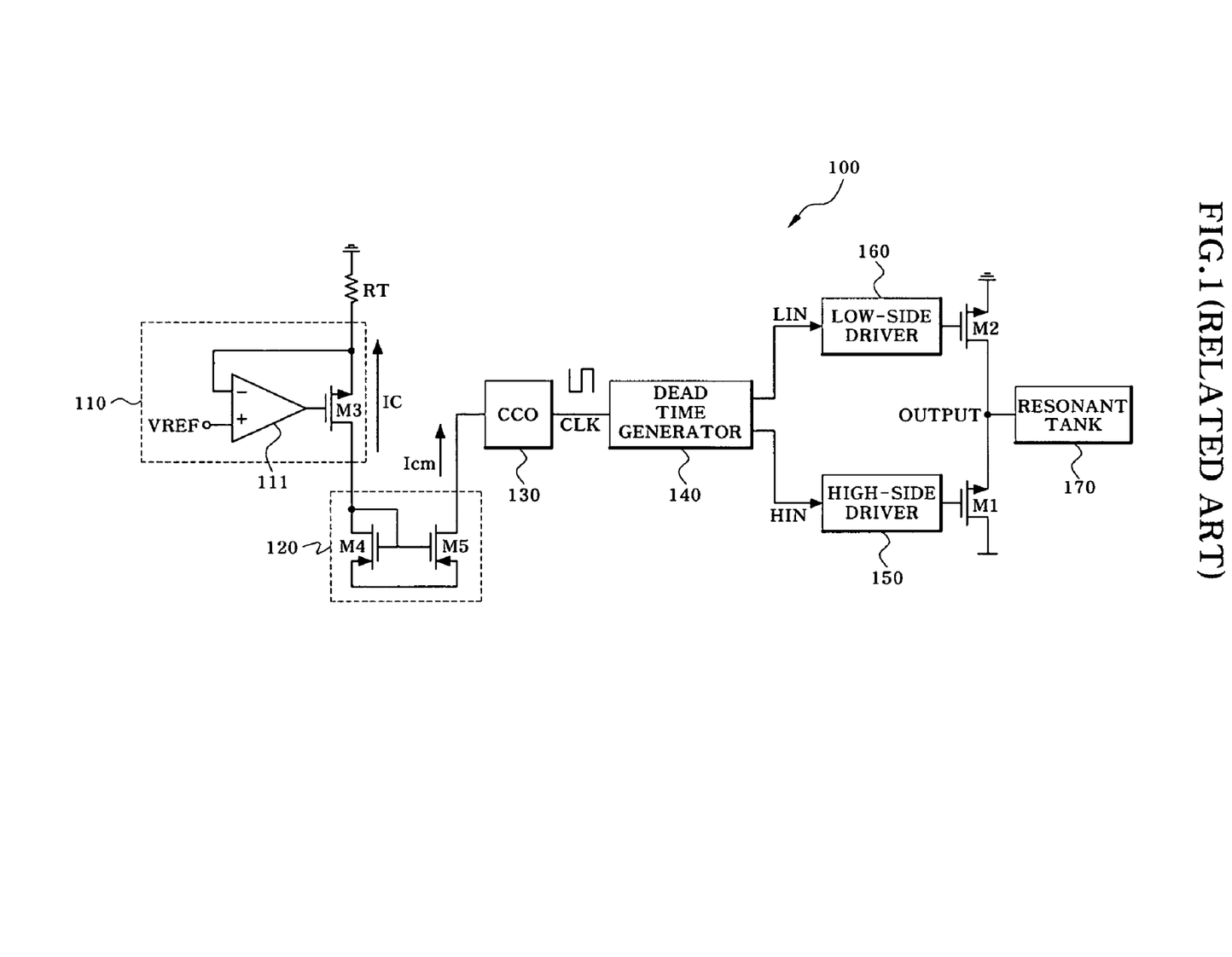
FIG. 1 illustrates a conventional resonant inverter.

FIG. 1 is a circuit diagram illustrating an example of a conventional resonant inverter 100. In FIG. 1 a voltage/current converter 110 includes an OP amplifier 111 and a transistor M3. Voltage/current converter 110 is connected to an external resistor RT. In operation, a reference voltage VREF is applied to a non-inverting terminal (+) of the OP amplifier 111. An inverting terminal (−) of the OP amplifier 111 and a source of the transistor M3 are connected to the external resistor RT. A current IC is drawn by the voltage/current converter 110 through the external resistor RT. A drain of the transistor M3 is connected to a current mirror 120. The current mirror 120 includes two transistors M4 and M5. The current mirror 120A outputs a mirror current Icm, proportional to a current IC. Mirror current Icm is applied to a current-controlled oscillator (CCO) 130.

The CCO 130 generates a square output clock CLK in accordance with the output from the current mirror 120. The output clock CLK is input to a dead time generator 140 which, in turn, generates a high-side input signal HIN and a low-side input signal LIN. The high-side input signal HIN is input to a high-side driver 150, whereas the low-side input signal LIN is input to a low-side driver 160. The high-side driver 150 controls a transistor M1 via the high-side input signal HIN. The low-side driver 160 controls a transistor M2 via the low-side input signal LIN. A source of the transistor M1 and a drain of the transistor M2 are connected to each other at an output node. A resonant tank 170 is connected to the output node. One of the functions of the resonant tank 170 is to be an output terminal of the resonant inverter.

Figure 2:
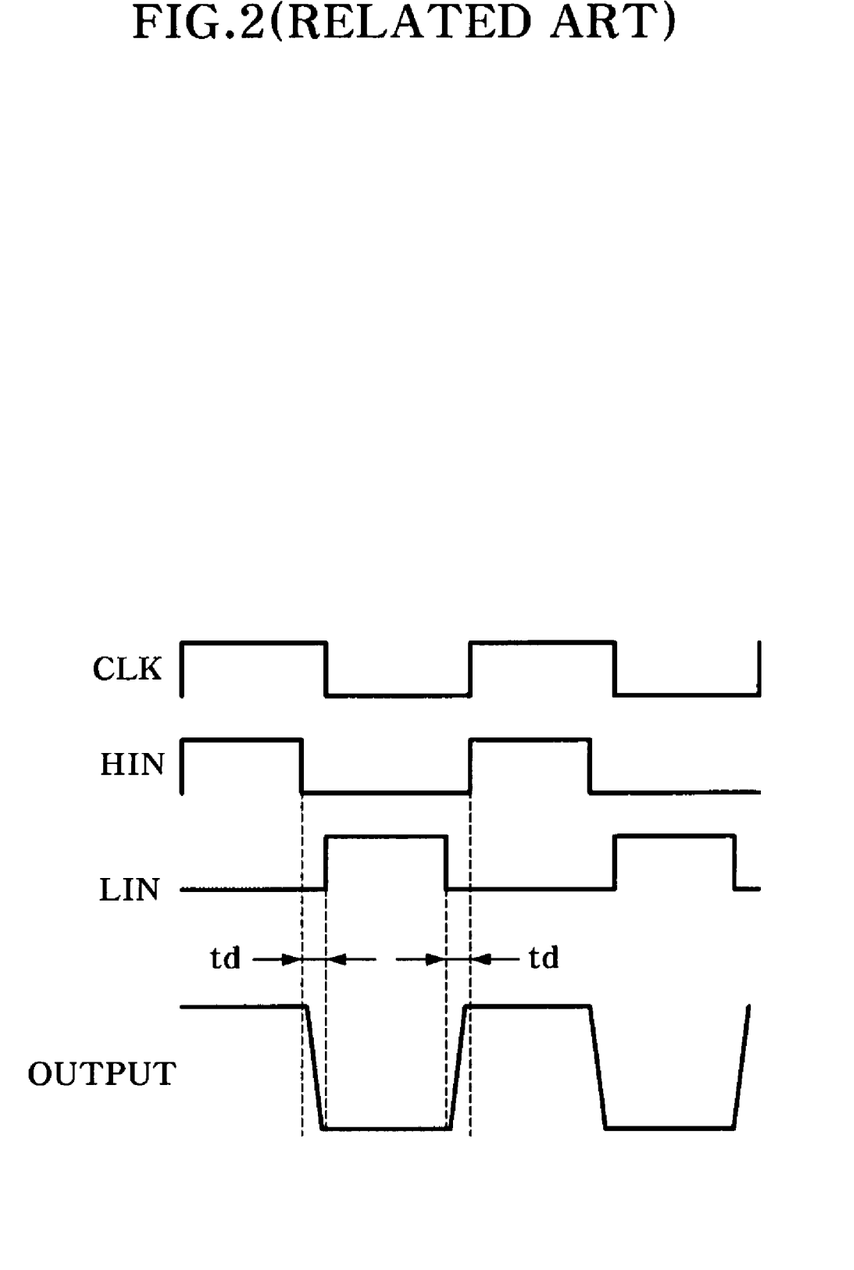
FIG. 2 illustrates a waveform of the resonant inverter of FIG. 1.

FIG. 2 is a waveform diagram illustrating an operation of the resonant inverter of FIG. 1. The current IC can be expressed by the following Equation (1):

$$IC = \frac{VREF}{RT} \quad (1)$$

The CCO 130 outputs an output clock CLK having an output frequency determined by Icm. When the transistors M1 and M2 are simultaneously turned on, the resonant inverter may be damaged due to short-circuit current flowing through the transistors M1 and M2. The dead time generator 140 prevents the transistors M1 and M2 from turning on simultaneously by an appropriate high-side input signal HIN and low-side input signal LIN. The dead time generator 140 introduces a dead time td, during which both the high-side input signal HIN and the low-side input signal LIN assume a low level, in short, both HIN and LIN are low. An output signal OUTPUT transitions during the dead time td. When the high-side input signal HIN is high, the transistor M1 is turned on and the transistor M2 is turned off. In this state, the output signal OUTPUT is high. On the other hand, when the low-side input signal LIN is high, the transistor M1 is turned off and the transistor 2 is turned on. In this state, the output signal OUTPUT is low.

Figure 3:
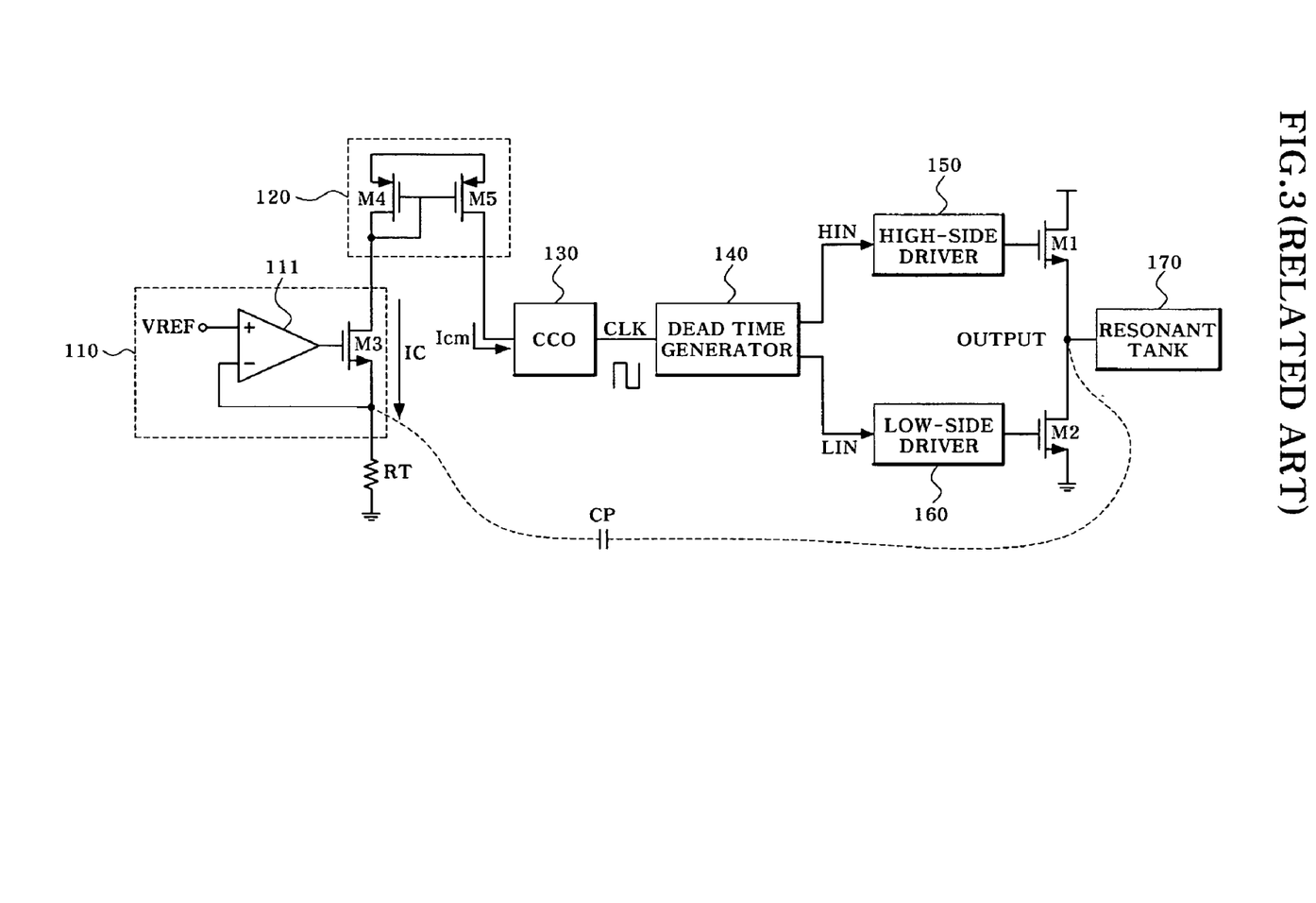
FIG. 3 illustrates an electrostatic coupling phenomenon in the resonant inverter of FIG. 1.

FIG. 3 is a circuit diagram to illustrate an electrostatic coupling phenomenon occurring in the resonant inverter of FIG. 1. A parasitic capacitor Cp may be formed between the output node of the resonant inverter and the node where the external resistor RT and the voltage/current converter 110 are connected. The formation of the parasitic capacitor Cp may be caused by various factors, for example, various patterns on a printed circuit board (PCB) on which the resonant inverter is formed.

A consequence of the presence of the parasitic capacitor Cp can be that the current IC flowing through the external resistor RT can be influenced by the output signal OUTPUT. As a result, the duty and output frequency of the CCO 130 can vary. Although such a phenomenon can be suppressed by reducing the capacitance of the parasitic capacitor Cp, this reduction can be difficult in practice. The influence of a current IP flowing through the parasitic capacitor Cp may also be reduced by increasing the current IC. In this case, however, the size of an oscillating capacitor (not shown) internally included in the CCO 130 may need to be increased, occupying excessive chip area.

SUMMARY

Therefore, it is an aspect of the invention to provide a resonant inverter capable of suppressing a variation of a duty and an output frequency of a current-controlled oscillator due to an influence of a parasitic capacitor.

In one aspect, a resonant inverter comprises a first driver and a second driver for driving a first switching device and a second switching device, respectively; a dead time generator, coupled to the first driver and configured to generate a first drive signal to drive the first driver, and coupled to the second driver and configured to generate a second drive signal to drive the second driver; a current-controlled oscillator, coupled to the dead time generator, configured to supply an output clock having a frequency based on a mirror current, input to the current-controlled oscillator; a current mirror for supplying the first current to the current-controlled oscillator in an amount proportional to a second current flowing toward an external resistor; a track/hold circuit, included in the current mirror, configured to facilitate the generation of the second current, wherein the second current is substantially equal to an amount of the second current supplied before a variation in the amount of the second current, during a transition of an output signal between the first and second switching devices; and a controller, coupled to the track and hold circuit for receiving the first and second drive signals, and generating a control signal adapted to operate the track/hold circuit.

The resonant inverter may further comprise a voltage/current converter arranged between the external resistor and the current mirror.

The current mirror may further include a first MOS transistor connected to the external resistor, and a second MOS transistor connected to the current-controlled oscillator.

The track/hold circuit may include a switch device arranged between a gate of the first MOS transistor and a gate of the second MOS transistor, and adapted to short-circuit or open the gates in accordance with a control signal from the controller, and a capacitor arranged between drains of the first and second MOS transistors connected to each other and a node between one terminal of the switch device and the gate of the second MOS transistor.

The switch device may comprise a MOS transistor.

The controller may receive the first and second drive signals, and may generate a control signal for opening the switch device during the transition of the output signal, and short-circuiting the switch device during a high-level or low-level period of the output signal.

The controller may generate a control signal for opening the switch device when the first and second drive signals are in a low-level state, and may generate a control signal for short-circuiting the switch device when at least one of the first and second drive signals is in a high-level state.

In some embodiments a resonant inverter comprises a first driver and a second driver for driving a first switching device and a second switching device, respectively; a dead time generator, coupled to the first driver and configured to generate a first drive signal to drive the first driver, and coupled to the second driver and configured to generate a second drive signal to drive the second driver; a current-controlled oscillator, coupled to the dead time generator, configured to supply an output clock having a frequency based on a first current, input to the current-controlled oscillator; a current mirror for supplying the first current to the current-controlled oscillator in an amount proportional to a second current flowing toward an external resistor; a track/hold circuit, included in the current mirror, configured to facilitate the generation of the second current, wherein the second current is substantially constant during a transition of an output signal generated by the first and second switching devices; and a controller, coupled to the track and hold circuit for receiving the first and second drive signals, and generating a control signal adapted to operate the track/hold circuit.

In some embodiments a resonant inverter comprises a first driver and a second driver for driving a first switching device and a second switching device, respectively; a dead time generator, coupled to the first driver and configured to generate a first drive signal to drive the first driver, and coupled to the second driver and configured to generate a second drive signal to drive the second driver; a current-controlled oscillator, coupled to the dead time generator, configured to supply an output clock having a frequency based on a first current, input to the current-controlled oscillator; a current mirror for supplying the first current to the current-controlled oscillator in an amount proportional to a second current flowing toward an external resistor; a track/hold circuit, included in the current mirror, configured to facilitate the generation of the first and second drive signal, wherein a duty of the first drive signal is substantially the same as a duty of the second drive signal; and a controller, coupled to the track and hold circuit for generating a control signal adapted to operate the track/hold circuit.

In some resonant inverters the duty of the first drive signal and the duty of the second drive signal may differ by no more than 5%.

In some resonant inverters the duty of the first drive signal and the duty of the second drive signal may be substantially independent of a value of a parasitic capacitor.

In some resonant inverters the parasitic capacitor may be capable of coupling a current from an output signal generated by the first and second switching devices towards an external resistor.

In some embodiments, a resonant inverter comprises a first driver and a second driver for driving a first switching device and a second switching device, respectively; a dead time generator, coupled to the first driver and configured to generate a first drive signal to drive the fist driver, and coupled to the second driver and configured to generate a second drive signal to drive the second driver; a current-controlled oscillator, coupled to the dead time generator, configured to supply an output clock having a frequency based on a first current, input to the current-controlled oscillator; a current mirror for supplying the first current to the current-controlled oscillator in an amount proportional to a second current flowing toward an external resistor; a track/hold circuit, included in the current mirror, configured to hold an information during a dead time; and a controller, coupled to the track and hold circuit configured to operate the track/hold circuit.

In some resonant inverters a difference between a duty of the first drive signal and a duty of the second drive signal can be less than 5%.

DETAILED DESCRIPTION

Figure 4:
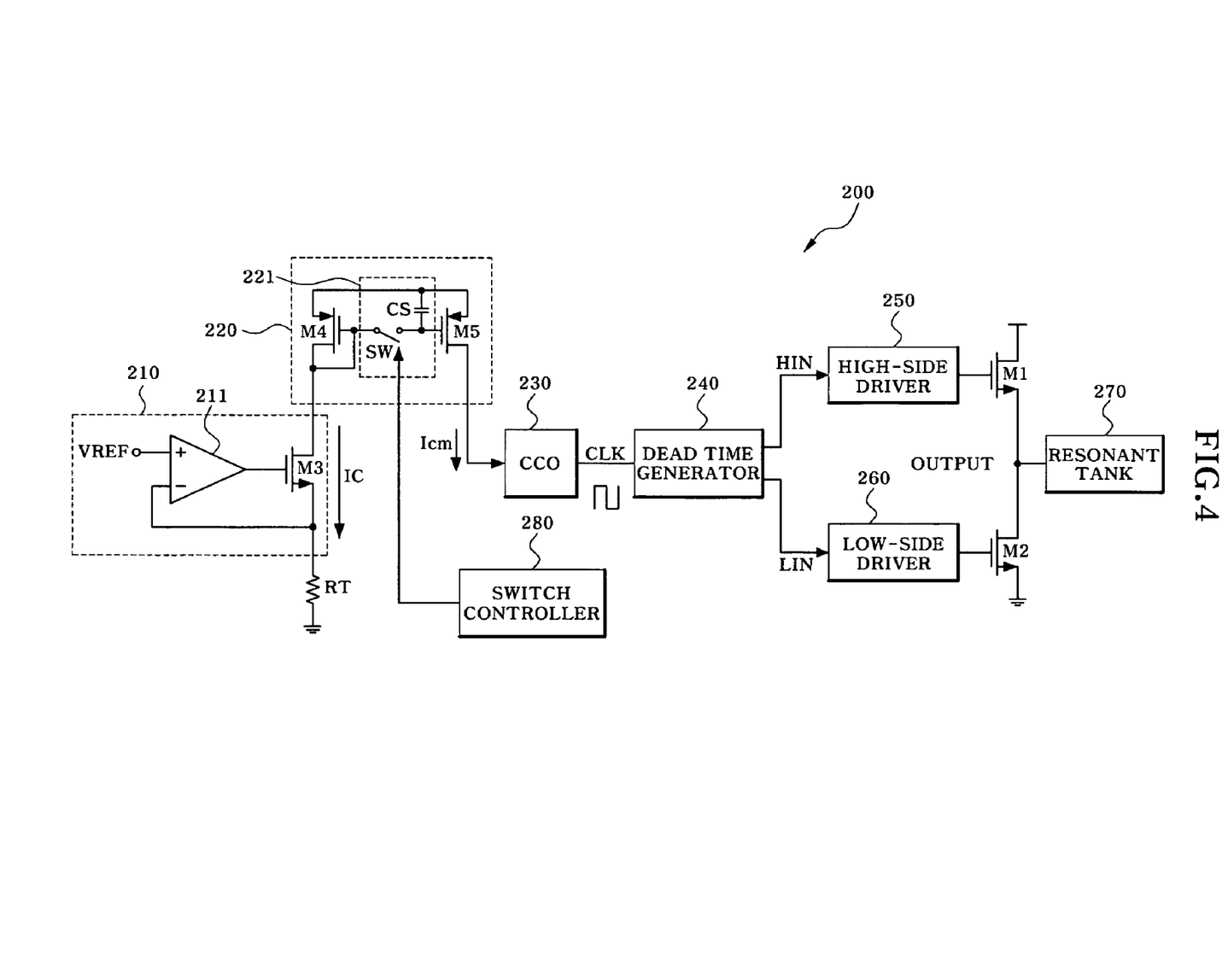
FIG. 4 illustrates a resonant inverter with a reduced duty variation.

FIG. 4 illustrates a resonant inverter 200 with a reduced duty variation. A voltage/current converter 210 includes an OP amplifier 211 and a transistor M3. The voltage/current converter 210 is connected to an external resistor RT. A reference voltage VREF is applied to a non-inverting terminal (+) of the OP amplifier 211. An inverting terminal (−) of the OP amplifier 211 and a source of the transistor M3 are connected to a first terminal of the external resistor RT. A second terminal of the external resistor RT is connected to the ground. A drain of the transistor M3 is connected to a current mirror 220. A drain-source current IC of the transistor M3 also flows through the external resistor RT.

The current mirror 220 can include transistors M4 and M5 and a track/hold circuit 221, arranged between the transistors M4 and M5. Transistors M4 and M5 can be p-type in some embodiments. A mirror current Icm, essentially a drain-source current of the transistor M5, is output by the current mirror 220 into a current-controlled oscillator (CCO) 230. The mirror current Icm is proportional to the current IC. The value of the current IC can be essentially independent of an output signal OUTPUT even in the presence of a parasitic capacitor (not shown). Accordingly, mirror current Icm and thus the duty and output frequency of the current-controlled oscillator (CCO) 230 is not influenced by variations of the output signal OUTPUT.

The track/hold circuit 221 can include a capacitor CS and a switch SW. A first terminal of the switch SW can be connected to a gate of the transistor M4, short-circuited with a source of the transistor M4. A second terminal of the switch SW can be connected to a gate of the transistor M5. A drain of the transistor M5 can be connected to the CCO 230. A first terminal of the capacitor CS can be connected to a node between the second terminal of the switch SW and the transistor M5. A second terminal of the capacitor CS can be connected to sources of the transistors M4 and M5, to which a source voltage VDD is applied in common. The switch SW may comprise a MOS transistor. The channel type of this transistor may be the same or may be different from the transistors M4 and M5. The operation of the track/hold circuit 221 will be described later.

The current mirror 220 outputs mirror current Icm, which is input in the CCO 230. The CCO 230 generates a square output clock CLK in accordance with the mirror current Icm. The output clock CLK can be input into a dead time generator 240 which, in turn, generates a high-side input signal ON and a low-side input signal LIN. The high-side input signal HIN can be input into a high-side driver 250, whereas the low-side input signal LIN can be input into a low-side driver 260.

The high-side driver 250 controls a transistor M1 in accordance with the high-side input signal HIN. The low-side driver 260 controls a transistor M2 in accordance with the low-side input signal LIN. The high-side input signal HIN and the low side input signal LIN can also be input into a switch controller 280. The switch controller 280 can generate a switch control signal CONTROL, to control a switching operation of the switch SW included in the track/hold circuit 221 of the current mirror 220. A DC voltage VDC is applied to a drain of the transistor M1. A source of the transistor M1 can be connected to a drain of the transistor M2 at an output node. A resonant tank 270 can be connected to the output node between the transistor M1 and the transistor M2. One function of the resonant tank 270 is to be an output terminal of the resonant inverter.

Figure 5:
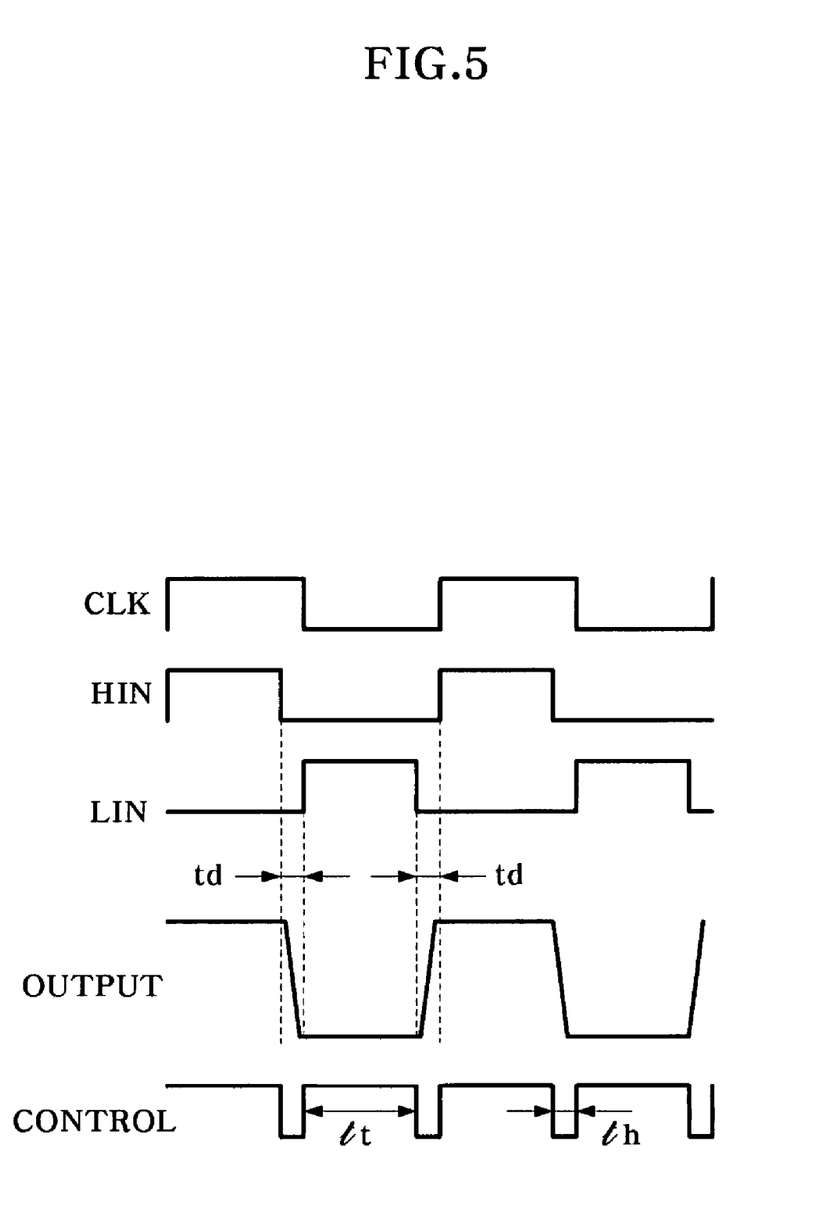
FIG. 5 illustrates a waveform of the resonant inverter of FIG. 4.

FIG. 5 illustrates a waveform of the resonant inverter 200. Current IC, flowing though external resistor RT, is again given by Equation (1): IC=VREF/RT. The mirror current Icm, input into the CCO 230 from the current mirror 220, is proportional to the current IC. The CCO 230 outputs an output clock CLK with an output frequency determined by the mirror current Icm. The output clock CLK from the CCO 230 is input to the dead time generator 240, which generates a high-side input signal HIN and a low-side input signal LIN.

The high-side input signal HIN is applied to the high-side driver 250, which generates a drive signal for driving the transistor M1. The low-side input signal LIN is applied to the low-side driver 260, which generates a drive signal for driving the transistor M2. The dead time generator 240 generates a low high-side input signal HIN and low-side input signal LIN for a dead time td, thus preventing the transistors M1 and M2 from turning on simultaneously. The output signal OUTPUT transitions during the dead time td. When the high-side input signal HIN is high, the transistor M1 is turned on and the transistor M2 is turned off. Accordingly, the output signal OUTPUT is high. On the other hand, when the low-side input signal LIN is high, the transistor M1 is turned off and the transistor M2 is turned on. Accordingly, the output signal OUTPUT is low.

The high-side input signal HIN and low-side input signal LIN generated by the dead time generator 240 are also input to the switch controller 280. When at least one of the high-side input signal HIN and low-side input signal LIN is high, the switch controller 280 generates a high switch control signal CONTROL. The period, for which is high, is referred to as a "tracking time $t_t$" in FIG. 5. When both the high-side input signal HIN and the low-side input signal LIN are low, the switch controller 280 generates a low switch control signal CONTROL. The period, for which the switch control signal CONTROL is low, is referred to as a "hold time $t_h$" in FIG. 5.

During the tracking time $t_t$, if the high-side input signal HIN is high, the transistor M1 is turned on and the transistor M2 is turned off. Accordingly, the output signal OUTPUT is high. On the other hand, if the low-side input signal LIN is high, the transistor M1 is turned off and the transistor M2 is turned on. In this case, the output signal OUTPUT is low. In either case, the switch controller 280 generates a high switch control signal CONTROL. In response to the high switch control signal CONTROL, the switch SW of the track/hold circuit 221 is closed. Accordingly, the current mirror 220 operates normally without being influenced by the track/hold circuit 221.

However, during the holding time $t_h$, when e.g. the high-side input signal HIN transitions from high to low while the low-side input signal LIN is low, the output signal OUTPUT transitions from high to low. Simultaneously, the switch controller 280 generates a low switch control signal CONTROL. In response to the low switch control signal CONTROL, the switch SW of the track/hold circuit 221 is opened. During this holding time $t_h$, the gates of the transistors M4 and M5 are disconnected from each other. Accordingly, the current mirror 220 outputs information stored in the capacitor CS of the track/hold circuit 221. This information was stored just before the opening of the switch SW and is used to operate the transistor M5. As a result, the transistor M5 is operated without being influenced by a parasitic capacitor formed due to the transition of the output signal OUTPUT.

Analogous waveforms are generated during the holding time $t_h$, when the low-side input signal LIN transitions from high to low, again resulting in a low control signal CONTROL.

Figure 6:
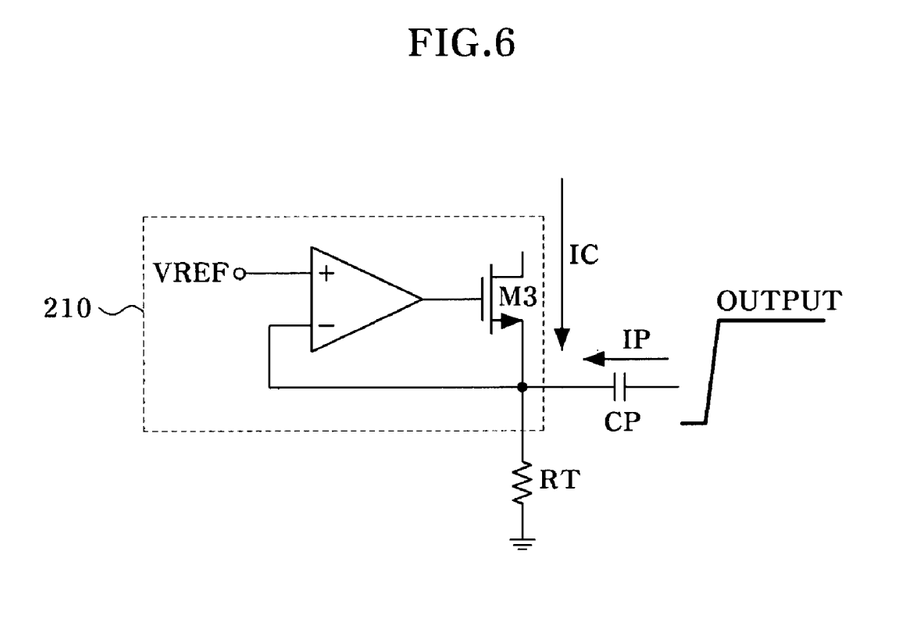
FIGS. 6 and 7 illustrate circuit diagrams for explaining a phenomenon that duty and output frequency variations caused by the presence of a parasitic capacitor occur.
Figure 7:
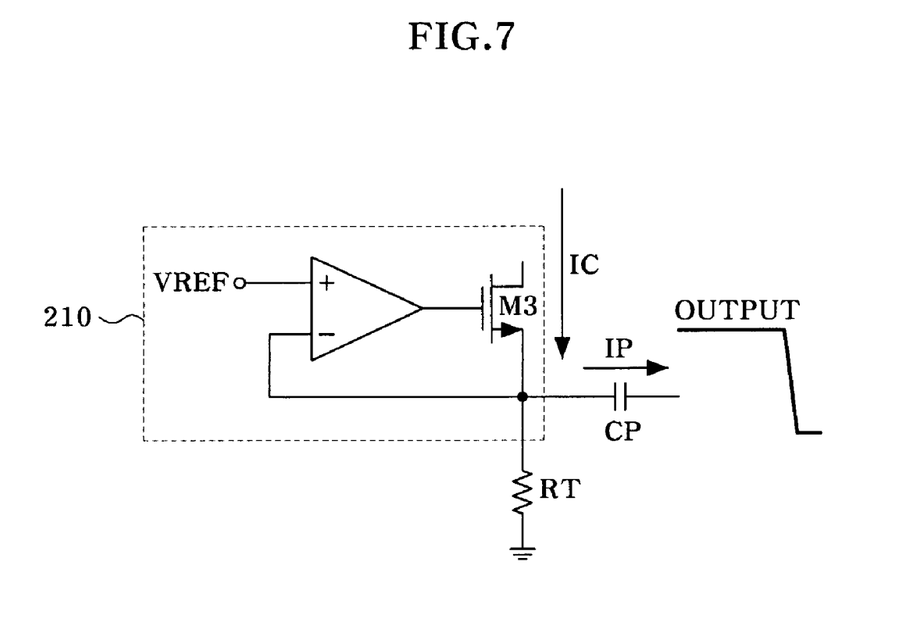

FIGS. 6 and 7 are circuit diagrams illustrating a phenomenon that duty and output frequency variations caused by the presence of a parasitic capacitor Cp are reduced by the track/hold circuit 221, illustrated in FIG. 4.

FIG. 6, together with FIG. 4, illustrates that when the output signal OUTPUT becomes high, the current IP flowing through the parasitic capacitor Cp is expressed by the following Equation (2):

$$IP = CP\frac{dv}{dt} \quad (2)$$

where "CP" is the value of the parasitic capacitance of the parasitic capacitor Cp and "dv/dt" is the gradient, or time derivative, of the output signal OUTPUT.

FIG. 6 illustrates that the current IP flows through the parasitic capacitor Cp toward the external resistor RT. As a result, the current IC flowing through the transistor M3 is reduced. This change in the current changes the frequency of the CCO 230 unless the track/hold circuit 221 operates.

Some embodiments have a negative feedback in relation to Vref. In these embodiments a current flowing through the external resistor RT is essentially Vref/RT. Without a parasitic capacitor the current through the external resistor RT equals the current Ic flowing through the transistor M3. In the presence of a parasitic capacitor Cp an additional current Ip flows through the external resistor RT. In these embodiments the overall current through the external resistor RT is maintained at essentially Vref/RT by reducing IC when Ip is flowing parallel to IC through the external resistor RT (FIG. 6), or by increasing IC when Ip is flowing opposite to IC through the external resistor RT (FIG. 7).

In some of the above embodiments this problem is addressed the following way. When the output signal OUTPUT rises from low to high, the switch controller 280 generates a low switch control signal CONTROL. In response to the low switch control signal CONTROL, the switch SW of the track/hold circuit 221 is opened, disconnecting the gates of the transistors M4 and M5 from each other. As a result, the current mirror 220 outputs information stored in the capacitor CS of the track/hold circuit 221 just before the opening of the switch SW to operate the transistor M5. Thus, although the current IC flowing through the transistor M3 is reduced due to the influence of the parasitic capacitor Cp, the current mirror 220 operates as if the current IC had not been modified.

FIG. 7 illustrates that when the output signal OUTPUT transitions to low, the current IP flowing through the parasitic capacitor Cp flows toward the output terminal. As a result, the current IC flowing through the external resistor RT is increased. This change in the current again changes the frequency of the CCO 230 unless the track/hold circuit 221 operates.

In some embodiments, this problem is addressed as follows. When the output signal OUTPUT falls from high to low, the switch controller 280 generates a low switch control signal CONTROL. In response to the low switch control signal CONTROL, the switch SW of the track/hold circuit 221 is opened. In this case, the gates of the transistors M4 and M5 are again disconnected from each other. As a result, the current mirror 220 outputs information stored in the capacitor CS of the track/hold circuit 221 just before the opening of the switch SW to operate the transistor M5. Thus, although the current IC flowing through the transistor M3 is increased due to the influence of the parasitic capacitor Cp, the current mirror 220 operates as if the current IC had not been modified.

Figure 8:
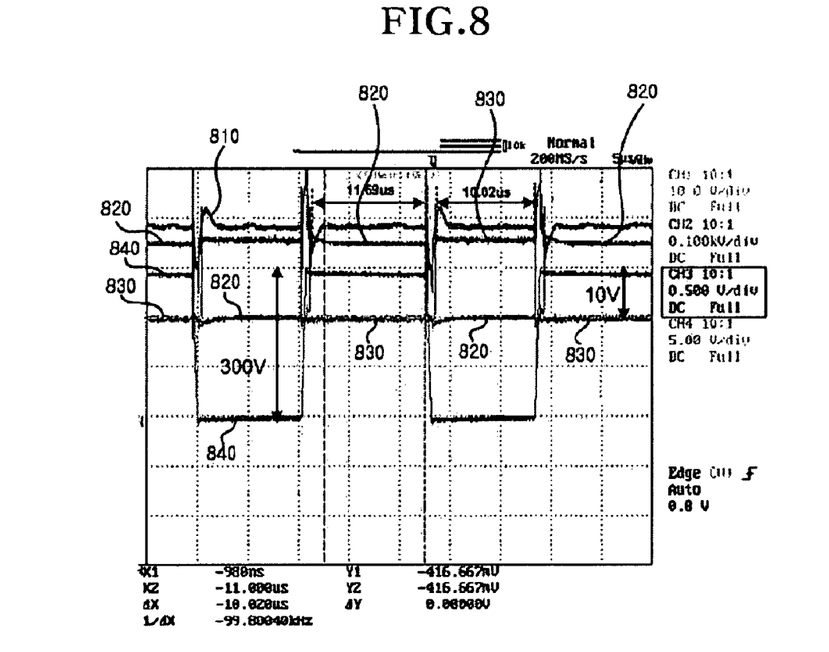
FIGS. 8 and 9 are graphs depicting results of operation tests respectively carried out for the resonant inverters of FIGS. 1 and 4.
Figure 9:
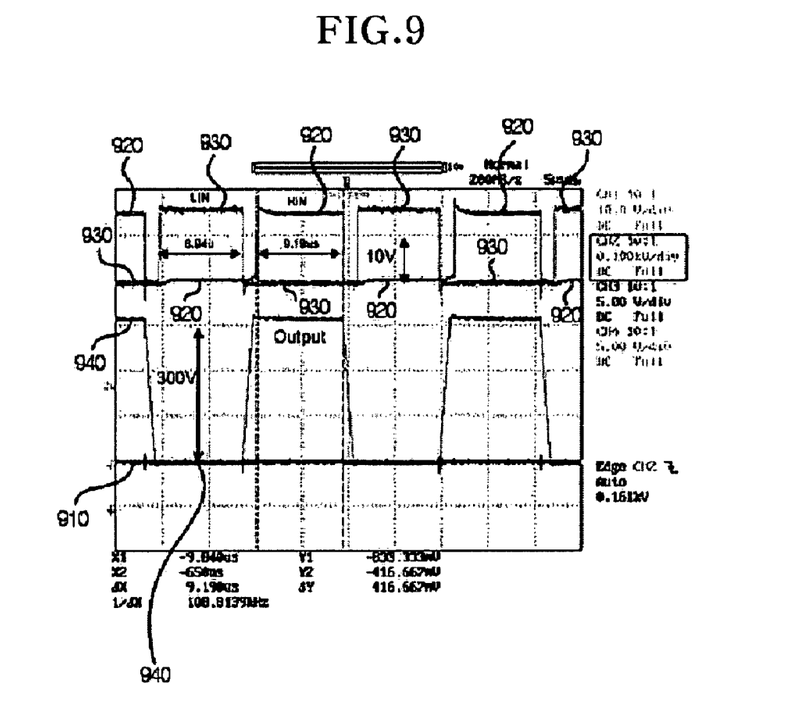

FIGS. 8 and 9 illustrate the waveforms of the resonant inverters of FIGS. 1 and 4, according to respective operation tests. The operation test of the resonant inverter of FIG. 1, which did not include the track/hold circuit 221 was performed using a DC voltage VDC of 300V. FIG. 8 illustrates that the resonant inverter of FIG. 1 exhibits a great variation in the voltage 810 applied to the external resistor RT and an undesirable duty variation in the high-side input signal HIN 820 and in the low-side input signal LIN 830, all caused by the parasitic capacitor Cp. As marked, the high-side input signal HIN 820 was high for 11.69 μs and the low-side input signal LIN 830 was high for 10.02 μs. These values represent a variation of the duty of about 16.7%—based on the low-side input signal LIN. In FIG. 8 the signal 840 represents output signal OUTPUT.

FIG. 9 illustrates the operation test for the resonant inverter of FIG. 4, performed using a DC voltage VDC of 300V. The resonant inverter of FIG. 4, which included the track/hold circuit 221, exhibited a greatly-reduced duty variation between the high-side input signal HIN 920 and the low-side input signal LIN 930, irrespective of the parasitic capacitor Cp. As marked, the high-side input signal HIN 920 was high for 9.19 μs and the low-side input signal LIN 930 was high for 8.94 μs. These values represent a variation of the duty of about 2.7%—based on the low-side input signal LIN. Even this duty variation may have been caused by the control circuit, for example, the dead time generator 240, rather than by the parasitic capacitor Cp. In FIG. 9 the signal 940 represents output signal OUTPUT.

As outlined above, in some embodiments, the transition of the resonant inverter occurs in the dead-time td. During this dead-time td the parasitic coupling between output signal OUT and external resistor RT is active. The effects of this parasitic coupling can be addressed by the track/hold technique. Track/hold circuits can hold preceding information during the dead-time td. Otherwise, the track/hold circuits can track a bias voltage determined by RT. In such embodiments, a duty mismatch caused by the parasitic coupling is reduced.

As apparent from the above description, the operation of a resonant inverter having a configuration capable of reducing duty and output frequency variations can be quite stable. This can be achieved in some embodiments by including a track/hold circuit into a current mirror, which provides an input signal to a current-controlled oscillator. The input signal will be substantially independent of the effects of parasitic capacitors during a rising or falling portion of an output signal. In some of these embodiments, a variation of the output frequency of the current-controlled oscillator is reduced, and duty variations in high-side and low-side input voltages are reduced.

Although embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A resonant inverter comprising:
   a first driver and a second driver for driving a first switching device and a second switching device, respectively;
   a dead time generator, coupled to the first driver and configured to generate a first drive signal to drive the first driver, and coupled to the second driver and configured to generate a second drive signal to drive the second driver;
   a current-controlled oscillator, coupled to the dead time generator, configured to supply an output clock having a frequency based on a mirror current, input to the current-controlled oscillator;
   a current mirror for supplying the first current to the current-controlled oscillator in an amount proportional to a second current flowing toward an external resistor;
   a track/hold circuit, included in the current mirror, configured to facilitate the generation of the second current, wherein the second current is substantially equal to an amount of the second current supplied before a variation in the amount of the second current, during a transition of an output signal between the first and second switching devices; and
   a controller, coupled to the track and hold circuit for receiving the first and second drive signals, and generating a control signal adapted to operate the track/hold circuit.

2. The resonant inverter according to claim 1, further comprising:
   a voltage/current converter arranged between the external resistor and the current mirror.

3. The resonant inverter according to claim 1, wherein the current mirror further includes a first MOS transistor connected to the external resistor, and a second MOS transistor connected to the current-controlled oscillator.

4. The resonant inverter according to claim 3, wherein the track/hold circuit includes:
   a switch device arranged between a gate of the first MOS transistor and a gate of the second MOS transistor, and adapted to short-circuit or open the gates in accordance with a control signal from the controller; and
   a capacitor arranged between drains of the first and second MOS transistors connected to each other and a node between one terminal of the switch device and the gate of the second MOS transistor.

5. The resonant inverter according to claim 4, wherein the switch device comprises a MOS transistor.

6. The resonant inverter according to claim 4, wherein the controller receives the first and second drive signals, and generates a control signal for opening the switch device during the transition of the output signal, and short-circuiting the switch device during a high-level or low-level period of the output signal.

7. The resonant inverter according to claim 6, wherein the controller generates a control signal for opening the switch device when the first and second drive signals are in a low-level state, and generates a control signal for short-circuiting the switch device when at least one of the first and second drive signals is in a high-level state.

8. A resonant inverter comprising:
a first driver and a second driver for driving a first switching device and a second switching device, respectively;
a dead time generator, coupled to the first driver and configured to generate a first drive signal to drive the first driver, and coupled to the second driver and configured to generate a second drive signal to drive the second driver;
a current-controlled oscillator, coupled to the dead time generator, configured to supply an output clock having a frequency based on a first current, input to the current-controlled oscillator;
a current mirror for supplying the first current to the current-controlled oscillator in an amount proportional to a second current flowing toward an external resistor;
a track/hold circuit, included in the current mirror, configured to facilitate the generation of the second current, wherein the second current is substantially constant during a transition of an output signal generated by the first and second switching devices; and
a controller, coupled to the track and hold circuit for generating a control signal adapted to operate the track/hold circuit.

9. A resonant inverter comprising:
a first driver and a second driver for driving a first switching device and a second switching device, respectively;
a dead time generator, coupled to the first driver and configured to generate a first drive signal to drive the first driver, and coupled to the second driver and configured to generate a second drive signal to drive the second driver;
a current-controlled oscillator, coupled to the dead time generator, configured to supply an output clock having a frequency based on a first current, input to the current-controlled oscillator;
a current mirror for supplying the first current to the current-controlled oscillator in an amount proportional to a second current flowing toward an external resistor;
a track/hold circuit, included in the current mirror, configured to facilitate the generation of the first and second drive signal, wherein a duty of the first drive signal is substantially the same as a duty of the second drive signal; and
a controller, coupled to the track and hold circuit for generating a control signal adapted to operate the track/hold circuit.

10. The resonant inverter of claim 9, wherein
the duty of the first drive signal and the duty of the second drive signal differ by no more than 5%.

11. The resonant inverter of claim 9, wherein
the duty of the first drive signal and the duty of the second drive signal is substantially independent of a value of a parasitic capacitor.

12. The resonant inverter of claim 11, wherein
the parasitic capacitor is capable of coupling a current from an output signal generated by the first and second switching devices towards an external resistor.

13. A resonant inverter comprising:
a first driver and a second driver for driving a first switching device and a second switching device, respectively;
a dead time generator, coupled to the first driver and configured to generate a first drive signal to drive the first driver, and coupled to the second driver and configured to generate a second drive signal to drive the second driver;
a current-controlled oscillator, coupled to the dead time generator, configured to supply an output clock having a frequency based on a first current, input to the current-controlled oscillator;
a current mirror for supplying the first current to the current-controlled oscillator in an amount proportional to a second current flowing toward an external resistor;
a track/hold circuit, included in the current mirror, configured to hold an information during a dead time; and
a controller, coupled to the track and hold circuit configured to operate the track/hold circuit.

14. The resonant inverter of claim 13, wherein
a difference between a duty of the first drive signal and a duty of the second drive signal is less than 5%.

* * * * *